(12) United States Patent
Walton et al.

(10) Patent No.: US 12,182,288 B2
(45) Date of Patent: Dec. 31, 2024

(54) REMEDIATING STORAGE OF SENSITIVE DATA ON HARDWARE DEVICE

(71) Applicant: Cisco Technology, Inc., San Jose, CA (US)

(72) Inventors: Allison Renner Walton, Raleigh, NC (US); Ana Andrijic, Raleigh, NC (US); Jazzmine Marie White, Raleigh, NC (US); David C. White, Jr., St. Petersburg, FL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 404 days.

(21) Appl. No.: 17/490,344

(22) Filed: Sep. 30, 2021

(65) Prior Publication Data
US 2023/0101945 A1 Mar. 30, 2023

(51) Int. Cl.
*G06F 21/62* (2013.01)

(52) U.S. Cl.
CPC ................. *G06F 21/6218* (2013.01)

(58) Field of Classification Search
USPC .......................................................... 726/26
See application file for complete search history.

(56) References Cited

U.S. PATENT DOCUMENTS

| 8,863,304 | B1 * | 10/2014 | Nagarkar | G06F 21/6245 713/182 |
| 11,227,591 | B1 * | 1/2022 | Ockene | G06F 21/32 |
| 2012/0240238 | A1 * | 9/2012 | Gates | H04N 21/41407 726/26 |
| 2014/0059355 | A1 | 2/2014 | Schuette et al. | |
| 2018/0129822 | A1 | 5/2018 | Martinez | |
| 2018/0130157 | A1 | 5/2018 | Gottschalk, Jr. et al. | |
| 2019/0034808 | A1 | 1/2019 | Palanichamy | |
| 2020/0204864 | A1 * | 6/2020 | Aggarwal | H04N 21/4854 |
| 2021/0097197 | A1 | 4/2021 | Kulkarni et al. | |

FOREIGN PATENT DOCUMENTS

WO WO-2018184441 A1 * 10/2018 ............. G06F 16/00

OTHER PUBLICATIONS

Cisco, "NXOS—Securely Erase the Contents of the Disk", Document ID: 216547, Jan. 11, 2021, 8 pages.
Cisco, "Cisco FXOS Troubleshooting for the Firepower 1000/2100 with ASA", Sep. 14, 2020, 44 pages.

* cited by examiner

*Primary Examiner* — Sanchit K Sarker
(74) *Attorney, Agent, or Firm* — Edell, Shapiro & Finnan, LLC (57) ABSTRACT

Techniques are provided herein for remediating storage of sensitive data on a hardware device. In one example, a request to remediate storage of sensitive data on a hardware device is obtained. In response to the request, a database is automatically searched. The database correlates the hardware device with an indication of how to remediate the storage of the sensitive data on the hardware device. Based on the database, the storage of the sensitive data on the hardware device is remediated.

20 Claims, 7 Drawing Sheets

REMEDIATING STORAGE OF SENSITIVE DATA ON HARDWARE DEVICE

TECHNICAL FIELD

The present disclosure relates to computer networking security.

BACKGROUND

Printed Circuit Boards (PCBs) are ubiquitous in computer networking technology. PCBs can include many individual hardware components, such as Integrated Circuits (ICs), chips, and elements of electronic circuits. PCBs can be integrated into various computer networking devices.

DESCRIPTION OF EXAMPLE EMBODIMENTS

Overview

Techniques are provided herein for remediating storage of sensitive data on a hardware device. In one example embodiment, a request to remediate storage of sensitive data on a hardware device is obtained. In response to the request, a database is automatically searched. The database correlates the hardware device with an indication of how to remediate the storage of the sensitive data on the hardware device. Based on the database, the storage of the sensitive data on the hardware device is remediated.

Example Embodiments

Figure 1A:
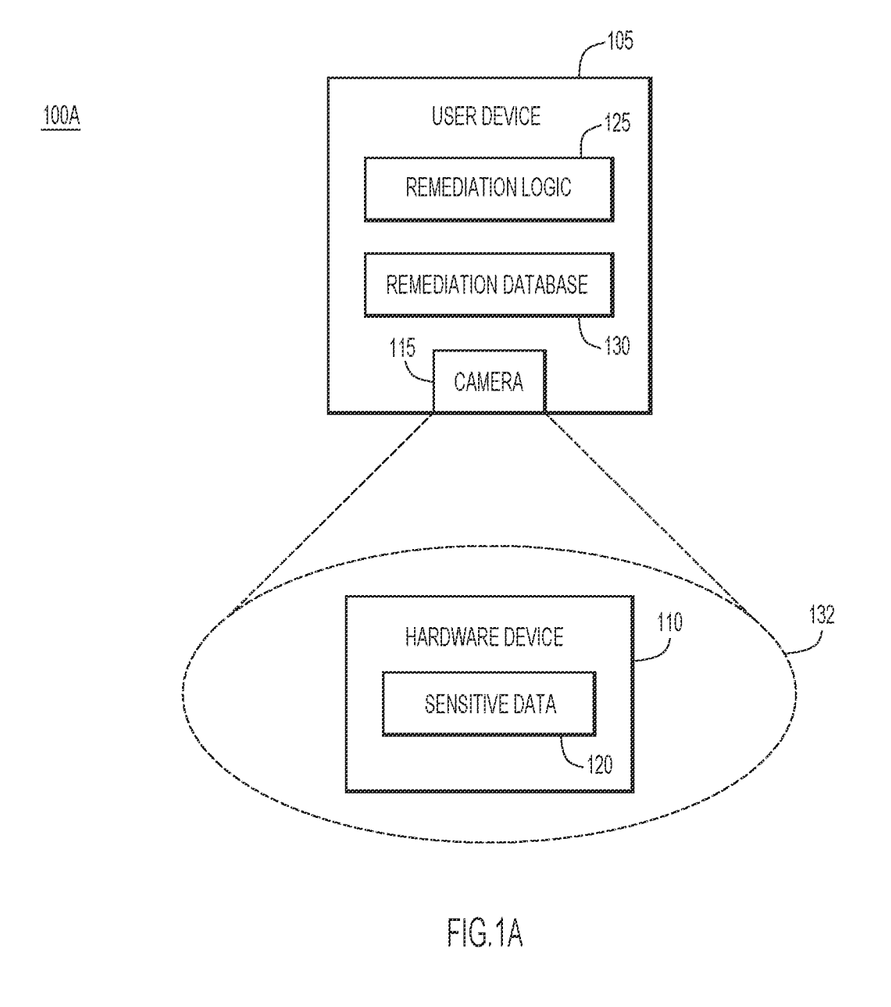
FIGS. 1A-1C illustrate respective systems for remediating storage of sensitive data on a hardware device, according to example embodiments.
Figure 1B:
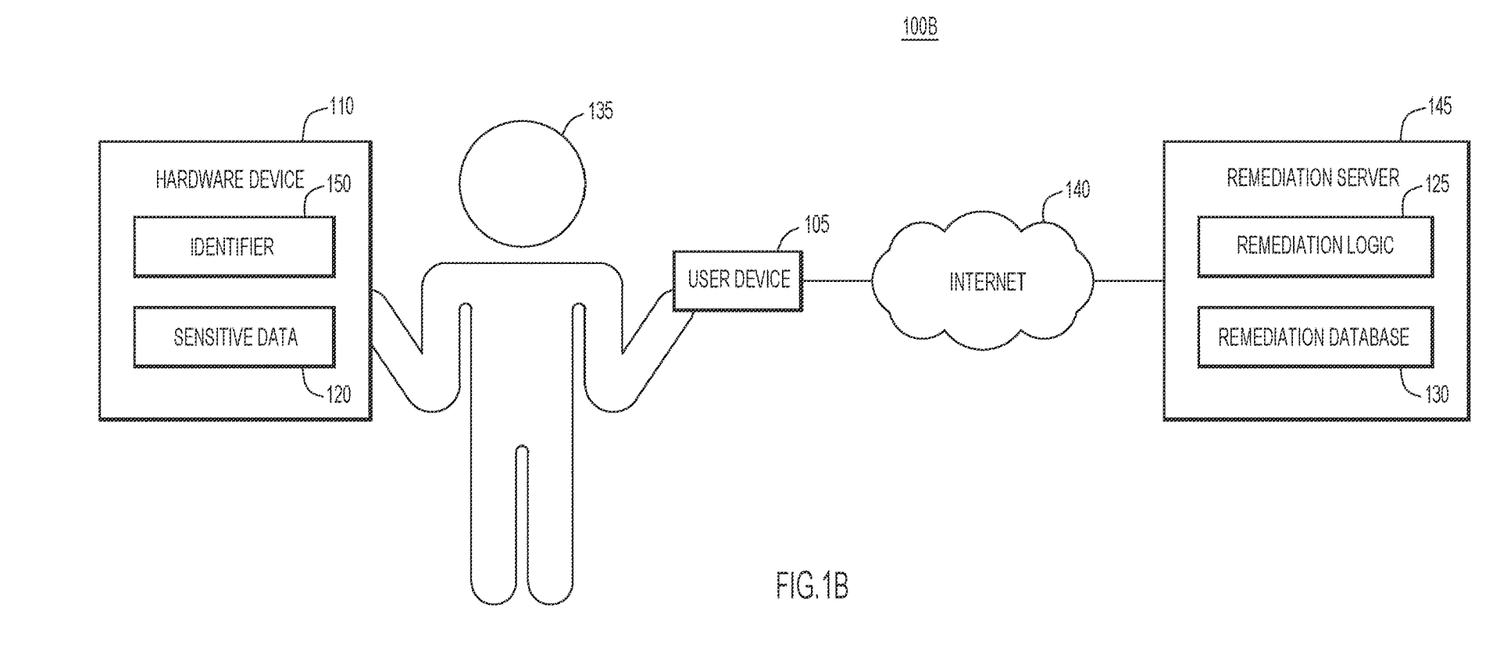
Figure 1C:
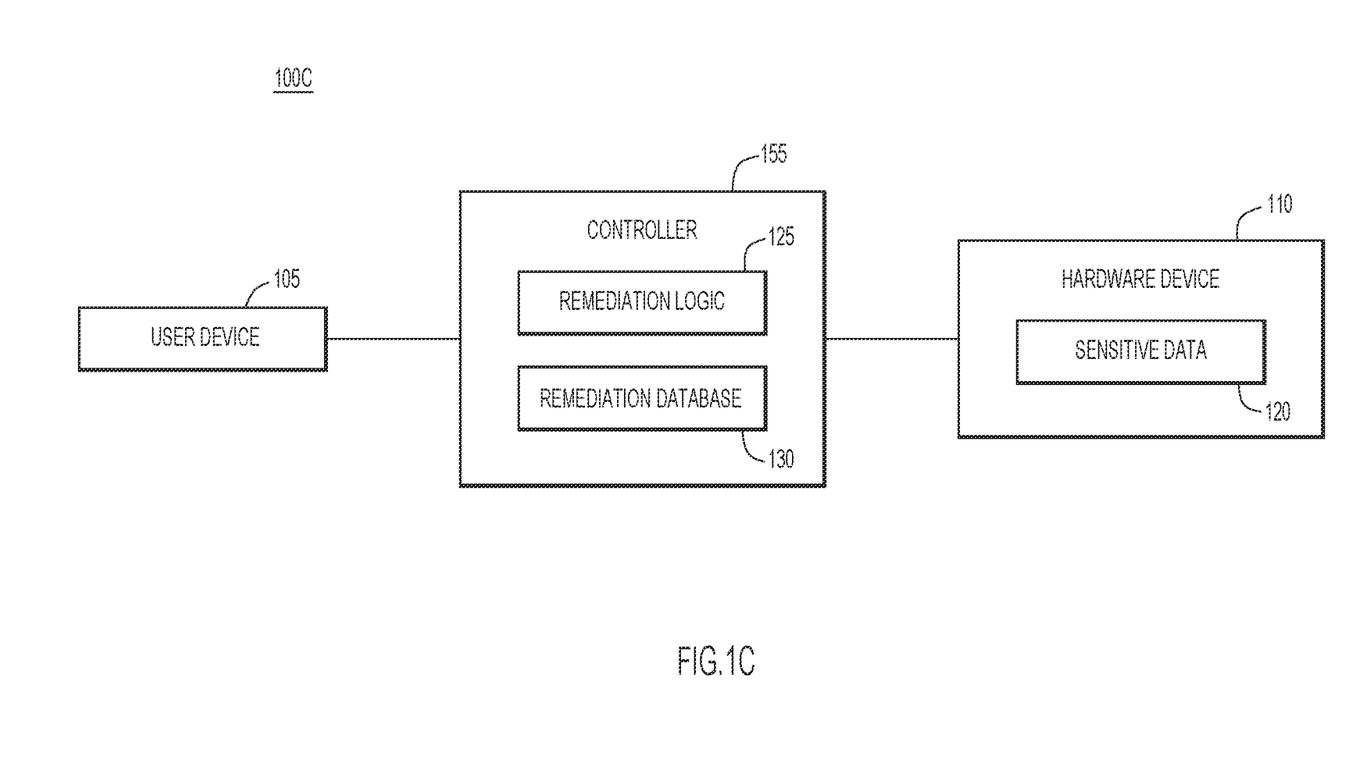

FIGS. 1A-1C illustrate respective systems 100A-100C for remediating sensitive data storage. System 100A includes user device 105 and hardware device 110. User device 105 may be any suitable device such as a smartphone, laptop, tablet, etc. User device 105 may include camera 115. Camera 115 may be configured to take pictures and/or capture video of the surrounding environment of user device 105.

Hardware device 110 may be any suitable computer networking hardware device. Hardware device 110 may be, or include, one or more individual hardware components (e.g., an IC, chip, or other component configured to attach/solder to a board) and/or one or more boards (e.g., a PCB or a line card). Hardware device 110 may be configured for use in/as a switch, router, supervisor, fabric, line card, etc.

Hardware device 110 stores sensitive data 120. Sensitive data 120 may be stored on memory of hardware device 110. For example, sensitive data 120 may be stored on an IC, chip, memory, PCB, etc. Sensitive data 120 may include computer networking addresses (e.g., Media Access Control (MAC) addresses, Internet Protocol (IP) addresses, IP tables, etc.); confidential information (e.g., Personally Identifiable Information (PII)) associated with the owner of hardware device 110; user names; passwords; networking/device configurations; Address Resolution Protocol (ARP) tables; etc. Sensitive data 120 may include any suitable information that could pose a security risk/threat if exposed to unauthorized parties.

Conventionally, when hardware device 110 fails, sensitive data 120 could become compromised. For example, if hardware device 110 fails while under warranty, the owner may be expected to return hardware device 110 to the manufacturer/vendor in exchange for a replacement hardware device. The owner may consider it a security risk to send hardware device 110 to any third-party (even the vendor) while hardware device 110 still contains sensitive data 120. Conventionally, sensitive data 120 could also become compromised if hardware device 110 is discarded or otherwise exposed or made available to a third party while storing sensitive data 120.

Accordingly, in order to resolve the security deficiencies in conventional techniques, remediation logic 125 is provided on user device 105. Remediation logic 125 causes user device 105 to perform operations for remediating the storage of sensitive data 120 on hardware device 110. The operations may include erasing sensitive data 120 from hardware device 110 (e.g., if hardware device 110 is accessible/operational) or providing an indication of operations/instructions for a user/administrator to perform remediation (e.g., if hardware device 110 is not accessible/operational). User device 105 also includes remediation database 130. User device 105 may use remediation database 130 to remediate the storage of sensitive data 120 on hardware device 110. In one form, remediation logic 125 and remediation database 130 may be part of an application that runs on user device 105.

In one example, user device 105 may obtain a request to remediate the storage of sensitive data 120 on hardware device 110. User device 105 may obtain an automated request from another device or a manual request from a user of user device 105 (e.g., a network administrator). Before, while, or after obtaining the request, camera 115 may take a picture or capture video of hardware device 110, as illustrated by dashed line 132. User device 105 may identify hardware device 110 from the picture or video using local or cloud-based machine learning techniques or any other suitable technique.

In response to the request to remediate the storage of sensitive data 120 on hardware device 110, user device 105 may automatically search remediation database 130. Remediation database 130 may correlate hardware device 110 with an indication of how to remediate the storage of sensitive data 120 on hardware device 110. For example, remediation database 130 may include information regarding how to clear sensitive data 120 from hardware device 110; how to reset hardware device 110 to a default setting to remove sensitive data 120 (e.g., instructions to execute a software reset command, such as "reset to factory defaults"); manual methods for clearing/overwriting/erasing/removing sensitive data 120; etc.

Consider an example in which hardware device 110 is an aggregated hardware device that includes one or more individual hardware components configured to store sensitive data 120 (e.g., hardware device 110 may be a board). In this example, remediation database 130 may correlate hardware device 110 with any individual hardware components on hardware device 110 that store sensitive data 120. Remediation database 130 may map the type of hardware of hardware device 110; the relevant individual hardware components (e.g., memory, Application-Specific Integrated Circuit (ASIC), etc.); how to physically remove one or more individual hardware components from hardware device 110; the location of the relevant individual hardware components on hardware device 110; a type of sensitive data 120 stored on the relevant individual hardware components; etc.

Based on remediation database 130, user device 105 may remediate the storage of sensitive data 120 on hardware device 110. User device 105 may remediate the storage of sensitive data 120 in any suitable manner. In one example, user device 105 may erase sensitive data 120 from hardware device 110. For instance, user device 105 may automatically execute the operations required to erase sensitive data 120 from hardware device 110.

In one specific example, user device 105 may prompt the user of user device 105 for access information for hardware device 110. The access information may include any suitable information that permits user device 105 to connect to hardware device 110, such as IP address, username, and password. User device 105 may obtain the access information from the user and, based on the access information, log into hardware device 110. User device 105 may provide a user-selectable indication of sensitive data 120, and the user may select the indication of sensitive data 120. For example, if hardware device 110 is an aggregated hardware device, the user may select one or more specific individual hardware components that store sensitive data 120 one-by-one or in bulk. In response to obtaining the user selection of sensitive data 120, user device 105 may execute one or more tasks to remediate the storage of sensitive data 120 on hardware device 110. The one or more tasks may be stored in remediation database 130. For example, user device 105 may send, to hardware device 110 (e.g., an aggregated hardware device and/or individual hardware components such as memories), instructions to take specific actions such as erasing, reformatting, overwriting, re-downloading code, etc. User device 105 may send a command via an Application Programming Interface (API) or Command Line Interface (CLI) push. User device 105 may provide/present, to the user of user device 105, a report indicating whether the remediation was success or failure.

User device 105 may also/alternatively provide one or more instructions for the user to manually erase sensitive data 120 from hardware device 110. If hardware device 110 is an aggregated hardware device, user device 105 may provide an indication of whether one or more individual hardware components are removable from hardware device 110, and/or the physical location of the individual hardware component(s) on hardware device 110. Based on the indication(s), the user may manually remove the individual hardware component(s) from hardware device 110 for secure disposal.

In another example, user device 105 may provide an indication of a type of sensitive data 120 stored on hardware device 110. The type of sensitive data 120 may help guide the user in determining which sensitive data 120 should be erased. In still another example, user device 105 may provide an indication of one or more operations to remediate the storage of sensitive data 120 from hardware device 110. The operations may include a series of steps displayed on user device 105. The user may follow the steps to erase/clear sensitive data 120, remove the individual hardware component storing sensitive data 120, etc. Once the user has completed the steps to remediate the storage of sensitive data 120 on hardware device 110, the user may mark the steps as completed via user device 105.

In a further example, user device 105 may identify a risk level/score associated with sensitive data 120 and provide an indication of the risk level. The risk level may indicate a risk to the user or owner should sensitive data 120 be exposed to a third party. Thus, the risk level may indicate a level of security corresponding to the erasure of sensitive data 120. For example, the risk level may indicate a risk associated with returning hardware device 110 to a vendor. If hardware device 110 is an aggregated hardware device, remediation database 130 may define the types of sensitive data 120 stored on hardware device 110 and the various individual hardware components. For each type of sensitive data 120, remediation database 130 may define an associated risk level.

Table 1 below illustrates example correlations between risk levels and types of sensitive information. While three risk levels are shown in Table 1 (i.e., high, medium, and low), any suitable number of risk levels may be used. Also, the risk levels may be represented in any suitable format (e.g., colors, numbers, etc.). Any suitable number of sensitive data types may be mapped to any suitable number of risk levels. Furthermore, any suitable sensitive data type may be mapped to any suitable risk level.

TABLE 1

| Risk Level | Sensitive Data Type |
| --- | --- |
| High | Private Keys |
|  | Clear-Text Passwords |
|  | Usernames (for login access) |
|  | Device Configuration |
|  | Email Addresses |
| Medium | IP Addresses |
|  | Device Name (hostname) |
|  | Location Information (for example: Simple |
|  | Network Management Protocol (SNMP) location) |
| Low | MAC Addresses |
|  | Serial Number(s) |
|  | Encrypted/Hashed Passwords |

As shown, private keys may correspond to a high risk level. Private keys may be considered high-risk because a bad actor could use a private key (e.g., for an X.509 certificate) to impersonate the device (or site or owner) of that private key. Effectively, the bad actor could have complete control over anything signed by the private key. For example, if the bad actor obtains a private key associated with the Transport Layer Security (TLS) certificate for a website, then the bad actor could stand up a fake website using the same public certificate as the real website. Using the private key, the bad actor could decrypt any communications to the fake website. As a result, the potential exposure of a private key may be assigned a high risk level. Therefore, individual hardware components that store private keys on hardware device 110 may be marked as containing a high-risk type of sensitive data 120.

By contrast, MAC addresses may correspond to a low risk level. This is because MAC addresses may be statically assigned to devices and generally do not grant access to anything or compromise communications. Knowing and identifying a MAC address might allow a bad actor to track the movement of a device or identify a device to an individual, but only if other pieces of information are known. As a result, exposed MAC addresses pose a low risk compared to, for instance, an exposed private key.

In certain examples, user device 105 may identify a plurality of risk levels associated with a plurality of types of sensitive data 120. In that case, user device 105 may determine a highest (e.g., most severe or worst) risk level from the plurality of risk levels and assign the highest risk level to hardware device 110. For instance, if hardware device 110 stores both a private key (high risk level) and a MAC address (low risk level), user device 105 may assign a high risk level to hardware device 110.

Hardware device 110 may be assigned the highest of associated risk levels regardless of whether hardware device 110 is an individual hardware component or an aggregated hardware device. If hardware device 110 is an individual hardware component that stores both a private key and a MAC address, hardware device 110 would be assigned a high risk level. Similarly, if hardware device 110 is an aggregated hardware device that includes a first individual hardware component that stores a private key and a second individual hardware component that stores a MAC address, hardware device 110 may be assigned a high risk level. But if hardware device 110 stores a MAC address and no higher-risk types of sensitive data 120, hardware device 110 may be assigned (e.g., marked as) a low risk level.

User device 105 may display a detailed summary of risks so that the user can see the different types of sensitive data 120 for hardware device 110. User device 105 and/or the user may perform automated and/or manual steps to reduce/mitigate/eliminate the associated risks. The risk level corresponding to hardware device 110 may change (e.g., lower) dynamically as the storage of sensitive data 120 on hardware device 110 is remediated. For example, if user device 105 and/or the user execute(s) the remediation steps to remove a private key, and then after those steps are executed the only remaining type of sensitive data 120 is a MAC address, the risk level of hardware device 110 may change from "high" (before the private key was removed) to "low" (after the private key was removed).

In a case where the user performs manual remediation steps/changes, the user may indicate which steps have been completed, and user device 105 may update/recalculate the risk level of hardware device 110 accordingly. Alternatively, user device 105 may automatically determine that certain manual steps have been completed and automatically update the risk level of hardware device 110. In one specific example, user device 105 may register, via camera 115, that an individual hardware component that stores a private key has been removed from hardware device 110. In this example, user device 105 may lower the risk level associated with hardware device 110 from "high" to "low."

In a case where user device 105 performs automated remediation steps/changes, user device 105 may automatically recalculate/update/lower the risk level. The updated risk level may reflect the remaining highest risk level(s) associated with hardware device 110. In one example, the user may command user device 105 to erase a specific instance of sensitive data 120, and, in response, user device 105 may automatically perform the steps to erase the specific instance of sensitive data 120. After completing the steps, user device 105 may automatically update the risk level to inform the user that automated remediation has taken place.

The user and/or user device 105 may perform remediation until hardware device 110 has dropped to a risk level that is satisfactory to the user. In one example, user device 105 may automatically perform remediation until the risk level passes below a threshold risk level (e.g., below the high risk level). In another example, the user may perform manual remediation until the risk level is acceptable to the user. For instance, if hardware device 110 is assigned a high risk level, the user and/or user device 105 may perform sufficient remediation tasks to lower the risk level of hardware device 110 to a medium risk level. If "medium" is an acceptable risk level for the user, the user could then decide that hardware device 110 may be returned to a vendor, repurposed, sold, etc.

In one example, user device 105 may provide a visual, real-time, automatic data risk assessment of hardware device 110 using a phone-based machine-learning application. The application may analyze hardware device 110 and perform a comprehensive security analysis that reveals the type and location of sensitive data 120. The analysis may also provide a process for clearing sensitive data 120, and may further provide an indication of a level of security that will be associated with hardware device 110 after the process is performed.

These techniques may enable the user may run a risk assessment, obtain information related to hardware device 110, and make an informed decision as to how hardware device 110 should be treated (e.g., disposed of, sent in for repairs/returns, etc.). For instance, the user may determine how sensitive data 120 can be securely erased, which individual hardware components might store sensitive data 120, and how sensitive data 120 could be recovered. In one example, based on the updated risk level calculated after the erasure mitigations are applied, the user may choose to return hardware device 110 with sensitive data 120 removed. Any suitable entity, such as a vendor or hardware provider, may provide these techniques for data storage risk evaluation.

While remediation logic 125 and remediation database 130 are shown in FIG. 1A as being located on user device 105, it will be appreciated that at least a portion of remediation logic 125 and/or remediation database 130 may be located elsewhere (e.g., on one or more servers). In one example, user device 105 may offload the identification of hardware device 110 to one or more servers but store remediation database 130 locally. In another example, user device 105 may identify hardware device 110 and provide the identification of hardware device 110 to one or more servers that store and search remediation database 130. In still another example, user device 105 may provide the picture or video that captures hardware device 110 to one or more servers that identify hardware device 110 and store and search remediation database 130. Other embodiments may be envisioned.

FIG. 1B illustrates another example system 100B for remediating sensitive data storage. System 100B includes hardware device 110, user device 105, Internet 140, and remediation server 145. In this example, hardware device 110 includes identifier 150. Identifier 150 may be any suitable identifier that corresponds to (e.g., uniquely identifies) hardware device 110. Identifier 150 may be, for example, a part number.

Here, remediation server 145 includes remediation logic 125 and remediation database 130. Remediation server 145 may run as a standalone/centralized service or solution. Remediation server 145 may, for instance, host a website that provides access to remediation database 130. In one example, user 135 may input identifier 150 into user device 105, and user device 105 may transmit identifier 150 to remediation server 145 via Internet 140. In another example, user device 105 may take a picture or capture video of the hardware device 110, automatically identify identifier 150, and send identifier 150 to remediation server 145 via Internet 140.

Remediation server 145 may obtain identifier 150 from user device 105 and search remediation database 130 based on the identifier 150. In this example, remediation database 130 may correlate identifier 150 with hardware device 110 and other information as discussed above in relation to FIG. 1A. Remediation server 145 may automatically identify hardware device 110 from identifier 150. Remediation server 145 may proceed with remediating the storage of sensitive data 120 on hardware device 110 based on operations similar to those described above in relation to FIG. 1A, such as providing a risk assessment for hardware device 110 and making recommendations to help protect sensitive data 120. In another example, remediation logic 125 and remediation database 130 may be located on user device 105 (e.g., as an application). The application may be configured to obtain identifier 150 and automatically identify hardware device 110 from identifier 150.

FIG. 1C illustrates yet another example system 100C for remediating sensitive data storage. System 100C includes user device 105, controller 155, and hardware device 110. In this example, remediation logic 125 and remediation database 130 are located on controller 155. Controller 155 may be configured to manage hardware device 110. In one example, user 135 may select hardware device 110 on user device 105. Based on the user selection, user device 105 may transmit a request, to controller 155, to remediate the storage of sensitive data 120 on hardware device 110. Controller 155 may automatically search database 130 in response to the request and proceed with remediating the storage of sensitive data 120 on hardware device 110 based on operations similar to those described above in relation to FIG. 1A. For example, controller 155 may provide a risk assessment for hardware device 110 and make recommendations to help protect sensitive data 120.

FIGS. 1A-1C illustrate different systems 100A-100C, but in at least some examples each system 100A-100C may be configured to identify sensitive data 120 stored on hardware device 110 and provide a corresponding risk level. Based on the risk score, user 135 may make an informed decision as to whether hardware device 110 should be returned to the vendor of hardware device 110. The decision may be based on the risk profile and security standards of user 135. With a comprehensive security analysis showing what and where sensitive data 120 is stored, as well as how to clear sensitive data 120, user 135 may be informed as to whether hardware device 110 should be securely disposed of or sent in for repairs and returns. These techniques may ensure that, if user 135 decides to permit hardware device 110 to leave the user/owner premises, hardware device 110 does not impermissibly contain sensitive data 120.

With continuing reference to FIGS. 1A-1C, FIGS. 2A and 2B illustrate respective user device displays (e.g., board information graphics) 200A and 200B for remediating storage of sensitive data 120 on hardware device 110. Device display 200A may include an annotated graphical rendering of hardware device 110. In this example, hardware device 110 is an aggregated hardware device (e.g., a board) with individual hardware components 210(1)-210(7). The annotated graphical rendering of hardware device 110 indicates the locations of individual hardware components 210(1)-210(7) on hardware device 110. The graphical rendering of hardware device 110 may include annotations 220(1)-220(5), which correspond to individual hardware components 210(1)-210(5), respectively. The graphical rendering of hardware device 110 may also include annotation 230, which corresponds generally to hardware device 110. In this example, individual hardware components 210(1)-210(5) store sensitive data 120, and individual hardware components 210(6) and 210(7) do not.

Figure 2A:
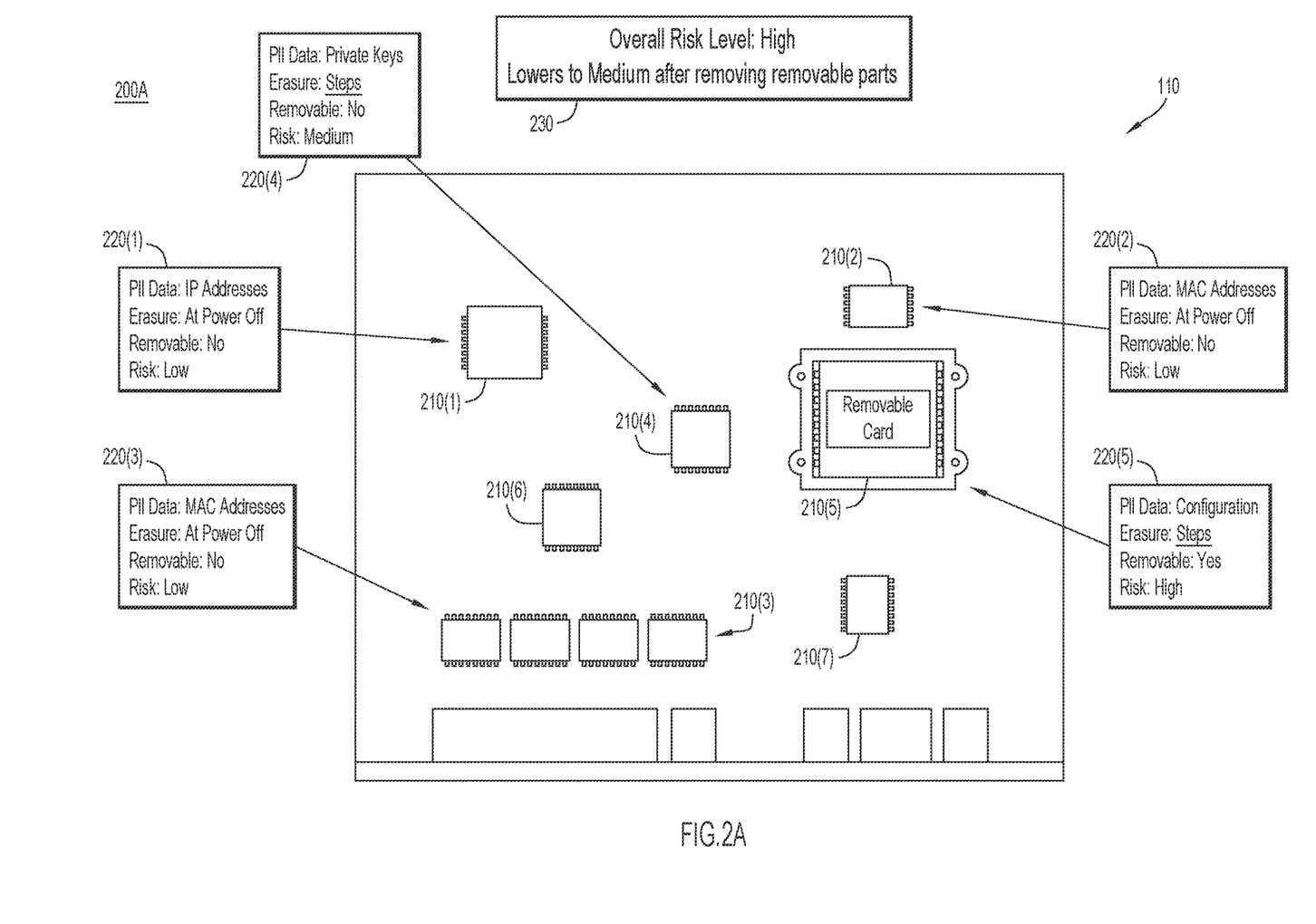
FIGS. 2A and 2B illustrate respective user device displays for remediating storage of sensitive data on a hardware device, according to example embodiments.

User device 105 (e.g., an application on user device 105), remediation server 145, and/or controller 155 may provide device display 200A for display on user device 105. In one example, device display 200A may include an annotated picture of hardware device 110 (or a similar/identical hardware device) stored on user device 105, remediation server 145, and/or controller 155. In another example, user device 105 may provide a user-rotatable graphical rendering of hardware device 110 (with annotations 210(1)-210(5)). In still another example, the graphical rendering may be a mock-up or drawing of hardware device 110. In yet another example, device display 200A may display a live video of hardware device 110 with annotations 220(1)-220(5) overlaid using augmented reality techniques.

Annotations 220(1)-220(5) may enable user 135 to visually identify: which of individual hardware components 210(1)-210(7) contain sensitive data 120 (e.g., PII data); the type of sensitive data 120; and the degree to which the safety associated with exposure of hardware device 110 changes when sensitive data 120 is removed/erased. Annotations 220(1)-220(5) and 230 may provide a risk assessment and analysis for individual hardware components 210(1)-210(5) and hardware device 110. Annotations 220(1)-220(5) further provide a visual representation to indicate how and where to remove one or more of individual hardware components 210(1)-210(5), how to securely erase one or more of individual hardware components 210(1)-210(5), and how to lower the risk of one or more of individual hardware components 210(1)-210(5).

Annotation 220(1) indicates that: individual hardware component 210(1) includes sensitive data 120 in the form of IP addresses; these IP addresses may be erased at power off; individual hardware component 210(1) is not removable from hardware device 110; and the risk level associated with individual hardware component 210(1) is low. The risk level associated with individual hardware component 210(1) is low because the risk level associated with IP addresses (i.e., low) is the highest associated risk level that is stored on individual hardware component 210(1).

Annotations 220(2) and 220(3) indicate that: individual hardware components 210(2) and 210(3) include sensitive data 120 in the form of MAC addresses; these MAC addresses may be erased at power off; individual hardware components 210(2) and 210(3) are not removable from hardware device 110; and the risk level associated with individual hardware components 210(2) and 210(3) are low. The risk level associated with individual hardware components 210(2) and 210(3) are low because the risk level associated with MAC addresses (i.e., low) is the highest associated risk level that is stored on individual hardware components 210(2) and 210(3).

Annotation 220(4) indicates that: individual hardware component 210(4) includes sensitive data 120 in the form of private keys; erasure of these private keys may be accomplished by following certain enumerated steps; individual hardware component 210(4) is not removable from hardware device 110; and the risk level associated with individual hardware component 210(4) is medium. The risk level associated with individual hardware component 210(4) is medium because the risk level associated with private keys (i.e., medium) is the highest associated risk level that is stored on individual hardware component 210(4).

Annotation 220(5) indicates that: individual hardware component 210(5) includes sensitive data 120 in the form of device configuration; erasure of the device configuration may be accomplished by following certain enumerated steps; individual hardware component 210(5) is removable from hardware device 110; and the risk level associated with individual hardware component 210(5) is high. The risk level associated with individual hardware component 210(5) is high because the risk level associated with device configuration (i.e., high) is the highest associated risk level that is stored on individual hardware component 210(5).

Note that the example risk levels associated with sensitive data types in FIG. 2A do not necessarily match the example risk levels shown in Table 1. For instance, in the example of FIG. 2A, IP addresses are associated with a low risk level, while in Table 1, IP addresses are associated with a medium risk level. Also, in the example of FIG. 2A, private keys are associated with a medium risk level, while in Table 1, private keys are associated with a high risk level. This is to demonstrate that any suitable risk level may be matched to any suitable sensitive data type. The mapping of risk level to sensitive data type may be configurable, and may differ among users/owners. In another example, a manufacturer/product provider may determine the risk levels and code the risk levels into a risk level database.

Device display 200A also includes annotation 230, which corresponds to hardware device 110. Annotation 230 indicates that the overall risk level associated with hardware device 110 is high. The risk level associated with hardware device 110 is high because the risk level associated with device configuration (i.e., high) is the highest associated risk level that is stored on hardware device 110. Annotation 230 also indicates that the risk level associated with hardware device 110 would lower to medium after the removable parts (e.g., individual hardware component 210(5)) have been removed.

Device display 200A may indicate, to user 135, which steps/actions to take to securely remove/erase sensitive data 120 from hardware device 110. For example, user 135 may review device display 200A, choose one or more of individual hardware components 210(1)-210(5) with an associated severity/risk, and follow the corresponding outlined steps. In one example, user 135 may select (e.g., click) "Steps" in annotation 220(5) to view steps for removing individual hardware component 210(5). In one example, user device 105 may display the steps while displaying device display 200A (e.g., overlaid or next to device display 200A). In another example, "Steps" may be a link that, when selected by user 135, causes user device 105 to display a webpage that includes the steps for removing individual hardware component 210(5).

Figure 2B:
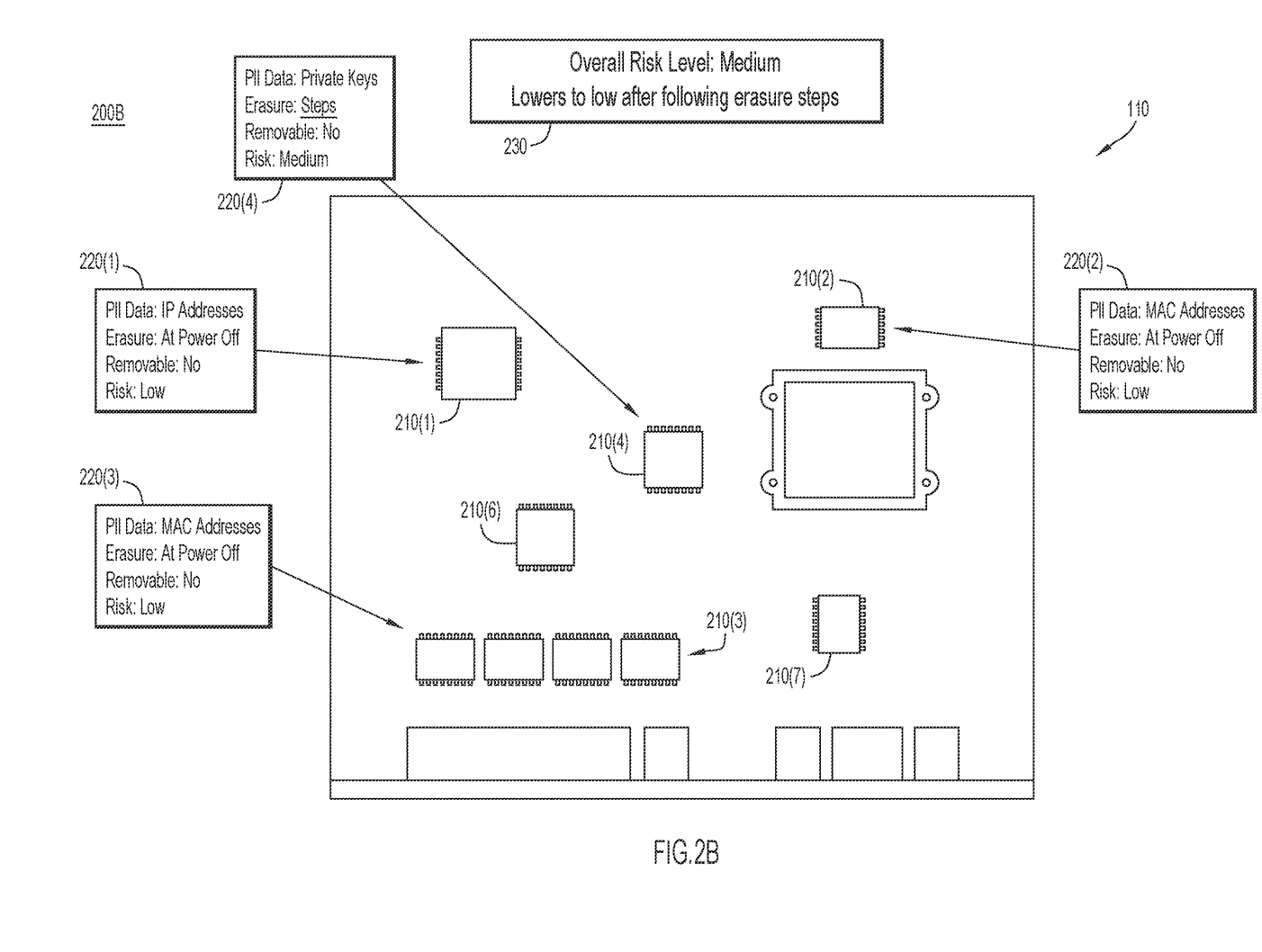

Device display 200B is similar to device display 200A, but device display 200B reflects changes to hardware device 110 after user 135 has removed individual hardware component 210(5). As shown, individual hardware component 210(5) and annotation 220(5) are no longer displayed. In one example, user device 105 may automatically display device display 200B based on a picture or video of hardware device 110 which shows that individual hardware component 210(5) has been removed. In another example, user 135 may manually indicate that the individual hardware component 210(5) has been removed.

Annotation 230 is also updated in device display 200B to indicate that the risk level associated with hardware device 110 is medium. The risk level associated with hardware device 110 is now medium because the risk level associated with private keys (i.e., medium) is the highest associated risk level that is stored on hardware device 110. Annotation 230 also indicates that the risk level associated with hardware device 110 would further decrease to "low" if erasure steps were followed (e.g., to erase the private keys from individual hardware component 210(4)). If an overall risk level of medium is acceptable, user 135 may forgo erasing the private keys; if an overall risk level of medium is not acceptable, user 135 may follow the steps to erase the private keys to decrease the risk level associated with hardware device 110 to "low."

Figure 3:
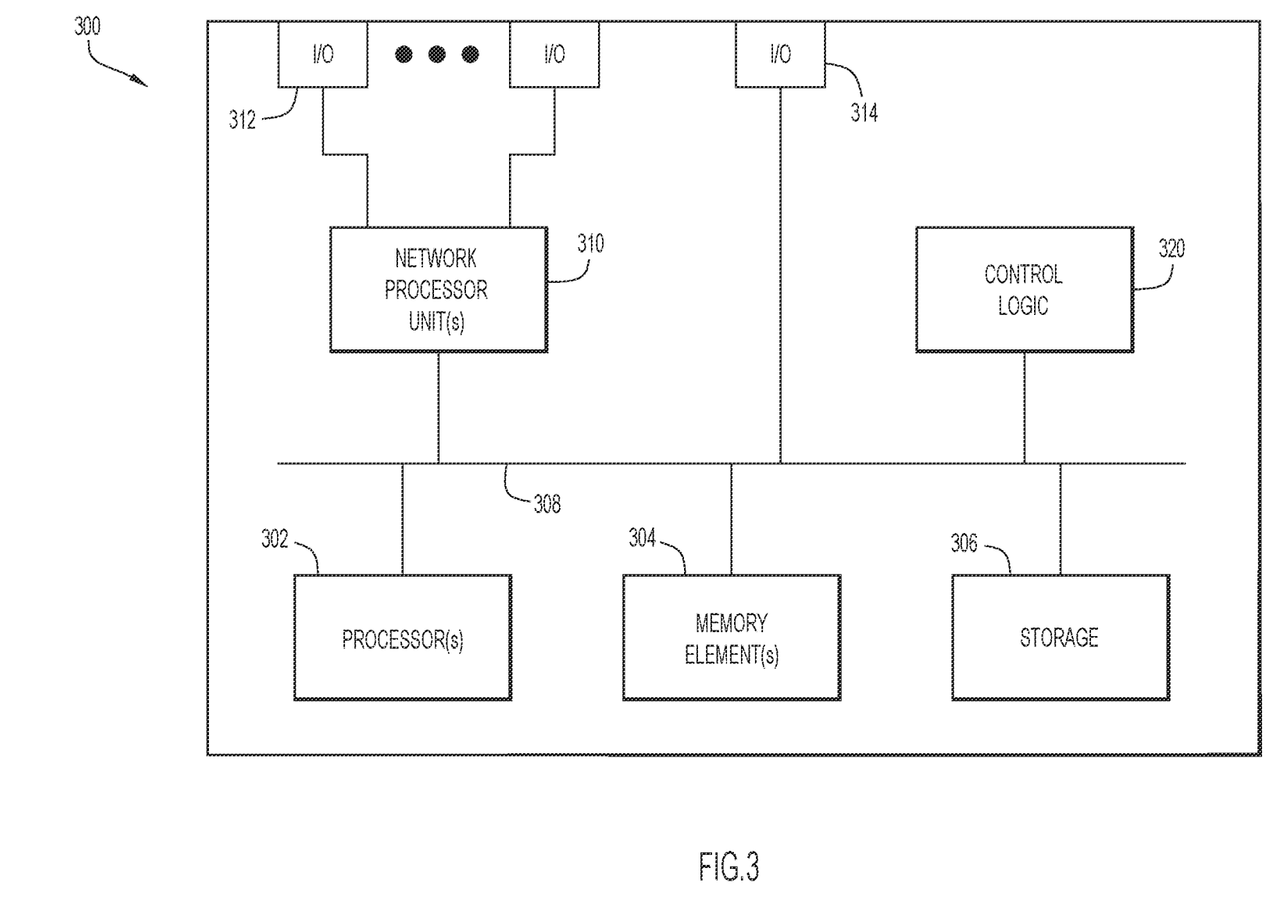
FIG. 3 illustrates a hardware block diagram of a computing device configured to perform functions associated with operations discussed herein, according to an example embodiment.

Referring to FIG. 3, FIG. 3 illustrates a hardware block diagram of a computing device 300 that may perform functions associated with operations discussed herein in connection with the techniques depicted in FIGS. 1A-1C, 2A, and 2B. In various embodiments, a computing device, such as computing device 300 or any combination of computing devices 300, may be configured as any entity/entities as discussed for the techniques depicted in connection with FIGS. 1A-1C, 2A, and 2B in order to perform operations of the various techniques discussed herein.

In at least one embodiment, computing device 300 may include one or more processor(s) 302, one or more memory element(s) 304, storage 306, a bus 308, one or more network processor unit(s) 310 interconnected with one or more network input/output (I/O) interface(s) 312, one or more I/O interface(s) 314, and control logic 320. In various embodiments, instructions associated with logic for computing device 300 can overlap in any manner and are not limited to the specific allocation of instructions and/or operations described herein.

In at least one embodiment, processor(s) 302 is/are at least one hardware processor configured to execute various tasks, operations and/or functions for computing device 300 as described herein according to software and/or instructions configured for computing device 300. Processor(s) 302 (e.g., a hardware processor) can execute any type of instructions associated with data to achieve the operations detailed herein. In one example, processor(s) 302 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 304 and/or storage 306 is/are configured to store data, information, software, and/or instructions associated with computing device 300, and/or logic configured for memory element(s) 304 and/or storage 306. For example, any logic described herein (e.g., control logic 320) can, in various embodiments, be stored for computing device 300 using any combination of memory element(s) 304 and/or storage 306. Note that in some embodiments, storage 306 can be consolidated with memory elements 304 (or vice versa), or can overlap/exist in any other suitable manner.

In at least one embodiment, bus 308 can be configured as an interface that enables one or more elements of computing device 300 to communicate in order to exchange information and/or data. Bus 308 can be implemented with any architecture designed for passing control, data and/or information between processors, memory elements/storage, peripheral devices, and/or any other hardware and/or software components that may be configured for computing device 300. In at least one embodiment, bus 308 may be implemented as a fast kernel-hosted interconnect, potentially using shared memory between processes (e.g., logic), which can enable efficient communication paths between the processes.

In various embodiments, network processor unit(s) 310 may enable communication between computing device 300 and other systems, entities, etc., via network I/O interface(s)

312 to facilitate operations discussed for various embodiments described herein. In various embodiments, network processor unit(s) 310 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 300 and other systems, entities, etc. to facilitate operations for various embodiments described herein. In various embodiments, network I/O interface(s) 312 can be configured as one or more Ethernet port(s), Fibre Channel ports, and/or any other I/O port(s) now known or hereafter developed. Thus, the network processor unit(s) 310 and/or network I/O interfaces 312 may include suitable interfaces for receiving, transmitting, and/or otherwise communicating data and/or information in a network environment.

I/O interface(s) 314 allow for input and output of data and/or information with other entities that may be connected to computing device 300. For example, I/O interface(s) 314 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 320 can include instructions that, when executed, cause processor(s) 302 to perform operations, which can include, but not be limited to, providing overall control operations of computing device 300; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 320) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 304 and/or storage 306 can store data, software, code, instructions (e.g., processor instructions), logic, parameters, combinations thereof, and/or the like used for operations described herein. This includes memory elements 304 and/or storage 306 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer usable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to computing device 300 for transfer onto another computer readable storage medium.

Figure 4:
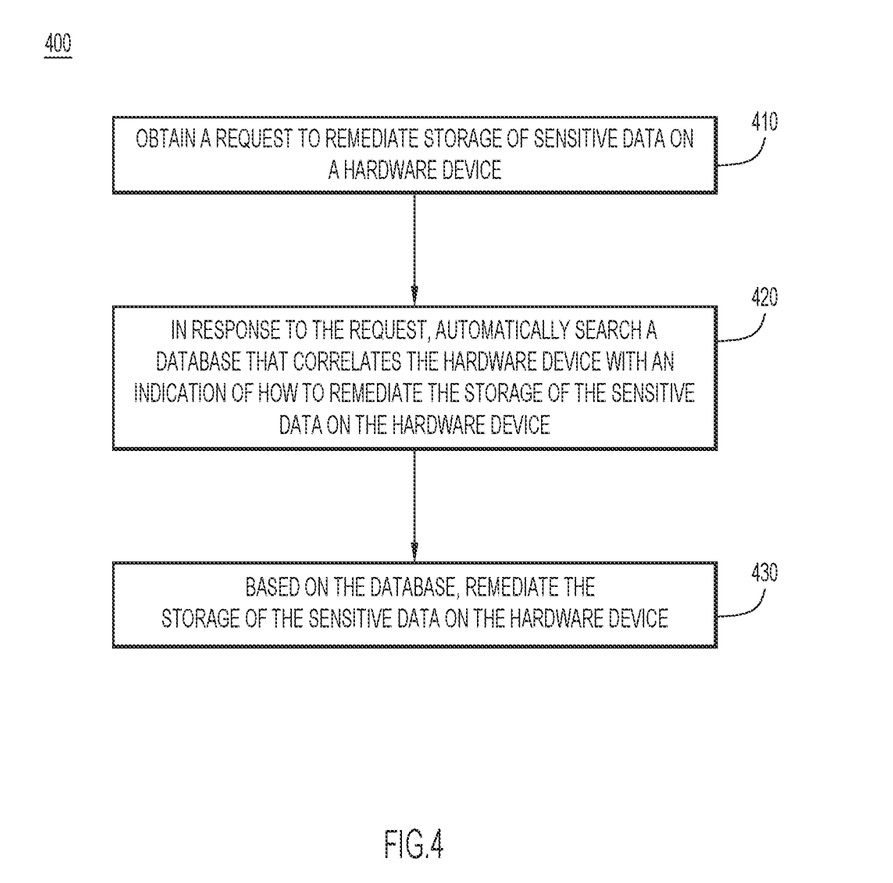
FIG. 4 illustrates a flowchart of a method for performing functions associated with operations discussed herein, according to an example embodiment.

FIG. 4 is a flowchart of an example method 400 for performing functions associated with operations discussed herein. Method 400 may be performed by any suitable entity, such as user device 105, remediation server 145, controller 155, or device 300. At operation 410, a request to remediate storage of sensitive data on a hardware device is obtained. At operation 420, in response to the request, a database that correlates the hardware device with an indication of how to remediate the storage of the sensitive data on the hardware device is automatically searched. At operation 430, based on the database, the storage of the sensitive data on the hardware device is remediated.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a computer-implemented method is provided. The computer-implemented method comprises: obtaining a request to remediate storage of sensitive data on a hardware device; in response to the request, automatically searching a database that correlates the hardware device with an indication of how to remediate the storage of the sensitive data on the hardware device; and based on the database, remediating the storage of the sensitive data on the hardware device.

In one example, obtaining the request to remediate the storage of the sensitive data on the hardware device includes: obtaining, from a user device, a picture or video of the hardware device, the computer-implemented method further comprising: identifying the hardware device from the picture or video.

In one example, obtaining the request to remediate the storage of the sensitive data on the hardware device includes: obtaining an identifier corresponding to the hardware device, the computer-implemented method further comprising: automatically identifying the hardware device from the identifier.

In one example, the hardware device is an aggregated hardware device that includes one or more individual hardware components configured to store the sensitive data. In a further example, the computer-implemented method further comprises: providing, for display on a user device, an annotated graphical rendering of the aggregated hardware device, wherein the annotated graphical rendering indicates one or more locations of the one or more individual hardware components on the aggregated hardware device. In another further example, the computer-implemented method further comprises: providing an indication of whether the one or more individual hardware components are removable from the aggregated hardware device.

In one example, the computer-implemented method further comprises: providing an indication of a type of the sensitive data stored on the hardware device.

In one example, remediating the storage of the sensitive data on the hardware device includes: providing an indication of one or more operations to remediate the storage of the sensitive data from the hardware device.

In one example, remediating the storage of the sensitive data on the hardware device includes: erasing the sensitive data from the hardware device.

In one example, the computer-implemented method further comprises: identifying a risk level associated with a type of the sensitive data; and providing an indication of the risk level. In a further example, identifying the risk level associated with the type of the sensitive data includes: identifying a plurality of risk levels associated with a plurality of types of the sensitive data; determining a highest risk level from the plurality of risk levels; and assigning the highest risk level to the hardware device.

In another form, an apparatus is provided. The apparatus comprises: a network interface configured to obtain or provide network communications; and one or more processors coupled to the network interface, wherein the one or more processors are configured to: obtain a request to remediate storage of sensitive data on a hardware device; in response to the request, automatically search a database that correlates the hardware device with an indication of how to remediate the storage of the sensitive data on the hardware device; and based on the database, remediate the storage of the sensitive data on the hardware device.

In another form, one or more non-transitory computer readable storage media are provided. The non-transitory computer readable storage media are encoded with instructions that, when executed by a processor, cause the processor to: obtain a request to remediate storage of sensitive data on a hardware device; in response to the request, automatically search a database that correlates the hardware device with an indication of how to remediate the storage of the sensitive data on the hardware device; and based on the database, remediate the storage of the sensitive data on the hardware device.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
   obtaining a request to remove sensitive data stored on a hardware device;
   in response to the request, automatically searching a database that correlates the hardware device with an indication of how to remove the sensitive data stored on the hardware device, wherein the database includes a mapping that maps a type of the hardware device to the indication of how to remove the sensitive data stored on the hardware device;
   identifying a risk level associated with a type of the sensitive data stored on the hardware device, wherein the database further includes a mapping that maps the type of the sensitive data stored on the hardware device to the risk level;
   providing an indication of the risk level; and
   based on the indication of the risk level and the indication of how to remove the sensitive data stored on the hardware device, removing the sensitive data from the hardware device.

2. The computer-implemented method of claim 1, wherein obtaining the request to remove the sensitive data stored on the hardware device includes:
   obtaining, from a user device, a picture or video of the hardware device, the computer-implemented method further comprising:
   identifying the hardware device from the picture or video.

3. The computer-implemented method of claim 1, wherein obtaining the request to remove the sensitive data stored on the hardware device includes:
   obtaining an identifier corresponding to the hardware device, the computer-implemented method further comprising:
   automatically identifying the hardware device from the identifier.

4. The computer-implemented method of claim 1, wherein the hardware device is an aggregated hardware device that includes one or more individual hardware components configured to store the sensitive data.

5. The computer-implemented method of claim 4, further comprising:
   providing, for display on a user device, an annotated graphical rendering of the aggregated hardware device, wherein the annotated graphical rendering indicates one or more locations of the one or more individual hardware components on the aggregated hardware device.

6. The computer-implemented method of claim 4, further comprising:
   providing an indication of whether the one or more individual hardware components are removable from the aggregated hardware device.

7. The computer-implemented method of claim 1, further comprising:
   providing an indication of the type of the sensitive data stored on the hardware device.

8. The computer-implemented method of claim 1, wherein removing the sensitive data from the hardware device includes:

providing an indication of one or more operations to remove the sensitive data from the hardware device.

9. The computer-implemented method of claim 1, wherein removing the sensitive data from the hardware device includes:
erasing the sensitive data from the hardware device.

10. The computer-implemented method of claim 1, wherein identifying the risk level associated with the type of the sensitive data includes:
identifying a plurality of risk levels associated with a plurality of types of the sensitive data;
determining a highest risk level from the plurality of risk levels; and
assigning the highest risk level to the hardware device.

11. An apparatus comprising:
a network interface configured to obtain or provide network communications; and
one or more processors coupled to the network interface, wherein the one or more processors are configured to:
obtain a request to remove sensitive data stored on a hardware device;
in response to the request, automatically search a database that correlates the hardware device with an indication of how to remove the sensitive data stored on the hardware device, wherein the database includes a mapping that maps a type of the hardware device to the indication of how to remove the sensitive data stored on the hardware device;
identifying a risk level associated with a type of the sensitive data stored on the hardware device, wherein the database further includes a mapping that maps the type of the sensitive data stored on the hardware device to the risk level;
providing an indication of the risk level; and
based on the indication of the risk level and the indication of how to remove the sensitive data stored on the hardware device, remove the sensitive data from the hardware device.

12. The apparatus of claim 11, wherein the one or more processors are further configured to:
obtain, from a user device, a picture or video of the hardware device; and
identify the hardware device from the picture or video.

13. The apparatus of claim 11, wherein the one or more processors are further configured to:
obtain an identifier corresponding to the hardware device; and
automatically identify the hardware device from the identifier.

14. The apparatus of claim 11, wherein the hardware device is an aggregated hardware device that includes one or more individual hardware components configured to store the sensitive data.

15. The apparatus of claim 11, wherein removing the sensitive data from the hardware device includes:
erasing the sensitive data from the hardware device.

16. One or more non-transitory computer readable storage media encoded with instructions that, when executed by a processor, cause the processor to:
obtain a request to remove sensitive data stored on a hardware device;
in response to the request, automatically search a database that correlates the hardware device with an indication of how to remove the sensitive data stored on the hardware device, wherein the database includes a mapping that maps a type of the hardware device to the indication of how to remove the sensitive data stored on the hardware device;
identifying a risk level associated with a type of the sensitive data stored on the hardware device, wherein the database further includes a mapping that maps the type of the sensitive data stored on the hardware device to the risk level;
providing an indication of the risk level; and
based on the indication of the risk level and the indication of how to remove the sensitive data stored on the hardware device, remove the sensitive data from the hardware device.

17. The one or more non-transitory computer readable storage media of claim 16, wherein the instructions further cause the processor to:
obtain, from a user device, a picture or video of the hardware device; and
identify the hardware device from the picture or video.

18. The one or more non-transitory computer readable storage media of claim 16, wherein the instructions further cause the processor to:
obtain an identifier corresponding to the hardware device; and
automatically identify the hardware device from the identifier.

19. The one or more non-transitory computer readable storage media of claim 16, wherein the hardware device is an aggregated hardware device that includes one or more individual hardware components configured to store the sensitive data.

20. The one or more non-transitory computer readable storage media of claim 16, wherein removing the sensitive data from the hardware device includes:
erasing the sensitive data from the hardware device.

* * * * *